United States Patent
Foster

(10) Patent No.: US 10,310,808 B2
(45) Date of Patent: Jun. 4, 2019

(54) SYSTEMS AND METHODS FOR SIMULTANEOUSLY RECEIVING VOICE INSTRUCTIONS ON ONBOARD AND OFFBOARD DEVICES

(71) Applicant: GOOGLE INC., Mountain View, CA (US)

(72) Inventor: Andrew Foster, Naremburn (AU)

(73) Assignee: GOOGLE LLC, Mountain View, CA (US)

( * ) Notice: Subject to any disclaimer, the term of this patent is extended or adjusted under 35 U.S.C. 154(b) by 123 days.

(21) Appl. No.: 14/842,986

(22) Filed: Sep. 2, 2015

(65) Prior Publication Data

US 2016/0070533 A1 Mar. 10, 2016

Related U.S. Application Data

(60) Provisional application No. 62/047,258, filed on Sep. 8, 2014.

(51) Int. Cl.
*G10L 15/22* (2006.01)
*G06F 3/16* (2006.01)
(Continued)

(52) U.S. Cl.
CPC ............ *G06F 3/167* (2013.01); *G01C 21/36* (2013.01); *G01C 21/3608* (2013.01);
(Continued)

(58) Field of Classification Search
CPC ......... G10L 15/22; G10L 15/28; G10L 15/30; G10L 15/32; G10L 15/265;
(Continued)

(56) References Cited

U.S. PATENT DOCUMENTS 6,721,633 B2 4/2004 Funk et al.
8,340,975 B1 * 12/2012 Rosenberger ........... G10L 15/22
704/270

(Continued)

OTHER PUBLICATIONS

Mowatt, "Nuance Voice Control for Automotive: Enabling a Single Consistent Voice User Interface to Connected Car Services," Nuance Communications (2009).

*Primary Examiner* — Michael N Opsasnick
(74) *Attorney, Agent, or Firm* — Marshall, Gerstein & Borun LLP

(57) ABSTRACT

To allow a user to provide a voice instruction to either a portable device or a computing device embedded within a vehicle, both the portable device and the embedded computing device receive the voice instruction such as, "Direct me to Kansas City." Moreover, both the portable device and the embedded computing device may determine the likelihoods that the portable device and the computing device, respectively, can carry out the voice instruction. The portable device and the computing device may then communicate with each other to compare the determined likelihoods. Based on the comparison, either the portable device or the computing device may respond to the voice instruction by, for example, playing a requested song, turning on the radio in the vehicle, providing navigation directions from the current location to a destination, etc.

19 Claims, 7 Drawing Sheets

(51) Int. Cl.
*G01C 21/36* (2006.01)
*G10L 15/26* (2006.01)

(52) U.S. Cl.
CPC .......... *G01C 21/3688* (2013.01); *G10L 15/22* (2013.01); *G10L 15/26* (2013.01); *G10L 2015/223* (2013.01); *G10L 2015/228* (2013.01)

(58) Field of Classification Search
CPC ......... G10L 2015/223; G10L 2015/226; G10L 2015/228
USPC ...................................... 704/270, 270.1, 275
See application file for complete search history.

(56) References Cited

U.S. PATENT DOCUMENTS

| | | | |
|---|---|---|---|
| 8,412,532 B2 | 4/2013 | Gruenstein et al. | |
| 2005/0289265 A1* | 12/2005 | Illowsky | G06F 1/3203 710/104 |
| 2006/0271364 A1* | 11/2006 | Mirkovic | G06F 17/28 704/239 |
| 2007/0050191 A1* | 3/2007 | Weider | G06F 17/30864 704/275 |
| 2007/0061067 A1* | 3/2007 | Zeinstra | G01C 21/36 455/563 |
| 2007/0129852 A1 | 6/2007 | Chen et al. | |
| 2009/0271200 A1 | 10/2009 | Mishra et al. | |
| 2010/0286983 A1* | 11/2010 | Cho | G10L 15/32 704/246 |
| 2011/0106375 A1* | 5/2011 | Gurusamy Sundaram | H04W 4/00 701/31.4 |
| 2012/0035924 A1* | 2/2012 | Jitkoff | G01C 21/3608 704/235 |
| 2013/0041665 A1* | 2/2013 | Jang | H04N 21/42203 704/246 |
| 2013/0073293 A1* | 3/2013 | Jang | G10L 15/22 704/275 |
| 2013/0238326 A1* | 9/2013 | Kim | G06F 3/167 704/231 |
| 2013/0300546 A1* | 11/2013 | Kim | G08C 19/00 340/12.22 |
| 2013/0344859 A1* | 12/2013 | Abramson | G06Q 50/265 455/418 |
| 2015/0032456 A1* | 1/2015 | Wait | G10L 15/26 704/275 |
| 2015/0113175 A1* | 4/2015 | Brzezinski | H04L 67/1095 709/248 |
| 2016/0027296 A1* | 1/2016 | Knox | G08C 17/02 340/870.02 |
| 2016/0042748 A1* | 2/2016 | Jain | G10L 25/48 704/9 |

* cited by examiner

SYSTEMS AND METHODS FOR SIMULTANEOUSLY RECEIVING VOICE INSTRUCTIONS ON ONBOARD AND OFFBOARD DEVICES

CROSS-REFERENCE TO RELATED APPLICATIONS

This application claims priority to provisional U.S. Application Ser. No. 62/047,258, filed on Sep. 8, 2014, entitled "Systems and Methods for Simultaneously Receiving Voice Instructions on Onboard and Offboard Devices," the entire disclosure of which is hereby expressly incorporated by reference herein.

FIELD OF THE DISCLOSURE

The present disclosure relates to voice recognition systems within a vehicle and, more particularly, to simultaneously receiving and analyzing user voice instructions at a vehicle head unit and a portable device communicatively connected to the head unit.

BACKGROUND

Today, many portable devices and/or vehicle head units are capable of responding to voice instructions from users (e.g., "Turn on the radio," "Call Billy," "Give me directions to Paris"). Using hands-free devices in a vehicle can reduce driving distractions, promote driving safety, and keep drivers' eyes on the road.

SUMMARY

When a user operates a vehicle, the vehicle may include both a computing device embedded within the vehicle or a head unit, and a portable device connected to the head unit via a communication link. The user may activate voice recognition for the embedded computing device and the portable device, simultaneously, and input a voice instruction to both devices (e.g., "Tell me where the University of Sydney is," "Text 'I'm coming home' to Kelly," "Open front windows"). In response, the devices may each determine the likelihood in which the respective device can successfully carry out the voice instruction. Then the devices may communicate with each other to determine which device will carry out the voice instruction based on their respective likelihoods. As a result, the portable device or the head unit may respond by for example, displaying a map including the University of Sydney, sending a text, opening the front windows, etc.

In particular, an example embodiment of the techniques of the present disclosure is a portable device including a communication interface to communicate with a computing device embedded within a vehicle via a short-range communication link, one or more processors coupled to the communication interface, and a non-transitory computer-readable memory coupled to the one or more processors and storing thereon instructions. The instructions, when executed by the one or more processors, cause the portable device to receive audio input, and determine a requested action based on the received audio input. The instructions further cause the portable device to determine a first likelihood that the portable device can carry out the requested action, determine a second likelihood that the embedded computing device can carry out the requested action, and determine whether the embedded computing device or the portable device should carry out the requested action based on the first likelihood and the second likelihood. In accordance with the determination based on the first likelihood and the second likelihood, the instructions cause the portable device to cause one of the embedded computing device or the portable device to carry out the requested action.

Another example embodiment is a portable device including a communication interface to communicate with a computing device embedded within a vehicle via a short-range communication link, one or more processors coupled to the communication interface, and a non-transitory computer-readable memory coupled to the one or more processors and storing thereon instructions. The instructions, when executed by the one or more processors, cause the portable device to receive audio input while the embedded computing device receives the same audio input, before determining whether the portable device or the embedded computing device will carry out a requested action based on the received audio input, and determine the requested action based on the received audio input. The instructions further cause the portable device to determine a first likelihood that the portable device can carry out the requested action, receive, from the embedded computing device, a second likelihood that the embedded computing device can carry out the requested action, and determine whether the embedded computing device or the portable device should carry out the requested action based on the first likelihood and the second likelihood. In accordance with the determination based on the first likelihood and the second likelihood, the instructions cause the portable device to cause one of the embedded computing device or the portable device to carry out the requested action.

Yet another example embodiment is a method for determining a device for responding to a voice instruction. The method includes receiving, in a portable device, audio input, while a computing device embedded within a vehicle receives the same audio input, before determining whether the portable device or the embedded computing device will carry out a requested action based on the received audio input. The method further includes determining the requested actions based on the received audio input, determining a first likelihood that the portable device can carry out the requested action, and receiving, from the embedded computing device, a second likelihood that the embedded computing device can carry out the requested action. Additionally, the method includes determining whether the embedded computing device or the portable device should carry out the requested action based on the first likelihood and the second likelihood. In accordance with the determination based on the first likelihood and the second likelihood, the method includes causing one of the embedded computing device or the portable device to carry out the requested action.

DETAILED DESCRIPTION

Overview

Figure 1:
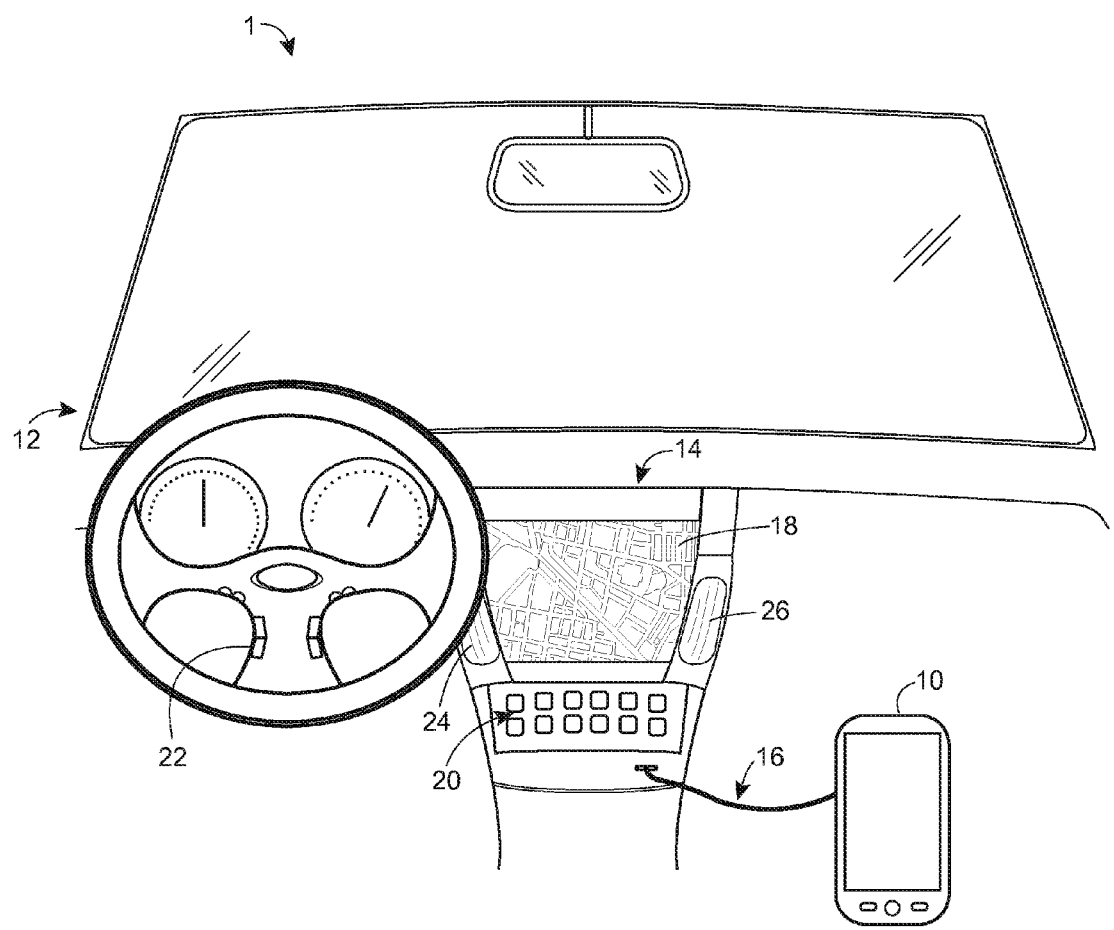
FIG. 1 illustrates an example vehicle in which the techniques of the present disclosure can be used to carry out the user's voice instruction.

To respond to a voice instruction intended for either a computing device embedded within a vehicle (also referred to herein as "a head unit" or an "embedded computing device") or a portable device communicatively connected to the head unit, both the portable device and the head unit receive the voice instruction (also referred to herein as "audio input") from a user. The portable device may then determine the appropriate device for carrying out the voice instruction by calculating a likelihood that the portable device can successfully carry out the voice instruction. For example, if the voice instruction is "Play Beethoven," the portable device may search music applications to determine whether there are any songs by Beethoven on the portable device, and may calculate a likelihood of successfully carrying out the voice instruction based on the results of the search. At the same time, the head unit may also calculate a likelihood that the head unit can successfully carry out the voice instruction in a similar manner and may send the calculated likelihood to the portable device. The portable device may then compare the likelihoods and, based on the comparison, cause the portable device or the head unit to carry out the voice instruction.

In this manner, a user can interact with multiple devices at the same time without having to decide beforehand which device is better equipped for carrying out the user's instruction. This technique may reduce the amount of distraction for a driver, because the driver would otherwise have to spend additional time thinking about which device she would like to use, and may have to press additional buttons to select the preferred device. Moreover, the user can speak "naturally" when instructing the devices, without learning a specific set of keywords or phrases for instructing the head unit as well as a separate set of keywords or phrases for instructing the portable device. Examples of voice instructions submitted in natural language include "Play radio station 97.9 FM," "Set temperature to 70 degrees," "Navigate to Sydney," "Play 'Symphony No. 5,'" and "Provide today's weather forecast for Melbourne."

Both the portable device and the head unit may search their respective applications to determine the likelihoods that the portable device ("first likelihood") and the head unit ("second likelihood") can successfully carry out the requested action by, for example, playing the requested radio station, setting the temperature in the vehicle, providing navigation directions to the Sydney Opera House, etc. The first and second likelihoods may be determined based on one or several success factors including for example, whether the portable device or the head unit can carry out the requested action at all, the quality in which the requested action can be carried out, user preferences based on machine learning, the speed in which the requested action can be carried out, the quality of the network connection for carrying out the requested action, etc. For example, the portable device may determine based on a weather application, that the portable device can quickly determine the weather in Melbourne with high accuracy, and as a result, the portable device may calculate a first likelihood of 0.9 based on the success factors. On the other hand, the head unit may determine that an Internet search would be required to determine the weather in Melbourne which may take a long time (especially if the quality of the network connection is poor) and may not be very accurate. As a result, the head unit may calculate a second likelihood of 0.4 based on the success factors.

The head unit can calculate and provide the second likelihood to the portable device which in turn, may compare the first likelihood to the second likelihood. Based on the comparison, the portable device may cause the portable device or the head unit to carry out the requested action. More specifically, the portable device may determine whether to (i) carry out the requested action, (ii) cause the head unit to carry out the requested action, or (iii) request more information from the user. The response to the requested action may be a visual response (e.g., displaying a map with navigation instructions, displaying text of sports scores, etc.), may be an audio response (e.g., replying, "The weather is London is 15 degrees Celsius," playing a specified radio station or song, etc.), may be an electrical/mechanical response (e.g., opening a window in the vehicle, turning on the air conditioning, calling a specified person, sending a text or email, etc.), or any other suitable response to the requested action.

Example Hardware and Software Components

Referring to FIG. 1, an example environment 1 in which the techniques outlined above can be implemented includes a portable device 10, and a vehicle 12 with a head unit 14. The portable device 10 may be a smart phone, a tablet computer, a laptop computer, or a wearable computing device, for example. The portable device 10 communicates with the head unit 14 of the vehicle 12 via a short-range communication link 16, which may be wired (e.g., wired Universal Serial Bus (USB)) or wireless (e.g., Bluetooth, Wi-Fi Direct, wireless USB). The portable device 10 also can communicate with various content providers, servers, etc. via a wireless long-range communication network such as a fourth- or third-generation cellular network (4G or 3G, respectively) and/or the Internet.

The head unit 14 can include a display 18 for presenting geographic data such as a digital map or navigation information. The display 18 in some implementations is a touch-screen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting geographic data. For example, the hardware input control 22 may be a voice activation button which may activate voice recognition on the head unit 14.

In addition to activating voice recognition, the head unit 14 may communicate a request over the short-range communication link 16, for the portable device 10 to activate voice recognition as well. As a result, the portable device 10 may also activate voice recognition when the user selects the voice activation button 22. The head unit 14 also can include audio input and output components such as a microphone 24 and speakers 26, for example. After the voice activation button is selected, the head unit 14 may receive audio input such as a voice instruction from the user via the microphone 24, while the portable device 10 receives the same voice instruction via a microphone in the portable device 10. In some embodiments, the head unit 14 may receive the audio input and transmit the audio input to the portable device 10 via the short-range communication link 16. Moreover, the head unit 14 can communicate with various content providers, servers, etc. via a wireless long-range communication network such as a fourth- or third-generation cellular network (4G or 3G, respectively) and/or the Internet.

Figure 2:
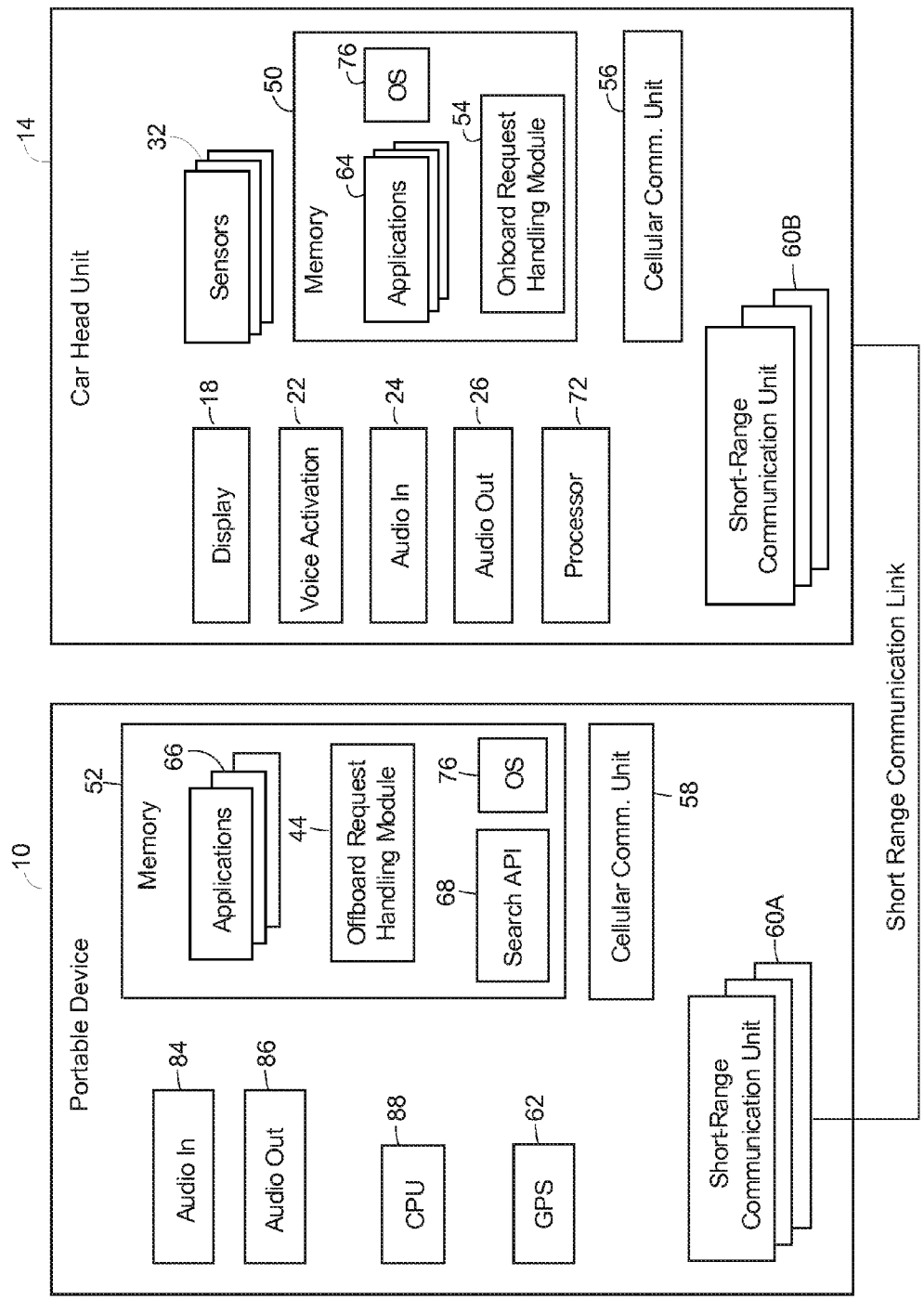
FIG. 2 is a block diagram of an example portable device, and an example head unit that can operate in the system of FIG. 1.

An example implementation of the portable device 10, and the head unit 14 is discussed next with reference to FIG. 2. As discussed above, the head unit 14 can include a display 18, a voice activation button 22, a microphone 24, and speakers 26. The head unit also can include a processor 72, a set of one or several sensors 32, a cellular communication unit 56 to transmit and receive data via a 3G cellular network, a 4G cellular network, or any other suitable network, one or several short-range communication units 60B, and a memory 50.

The set of sensors 32 can include, for example, a global positioning system (GPS) module to determine the current location of the vehicle in which the head unit 14 is installed, an inertial measurement unit (IMU) to measure the speed, acceleration, wheel rotation, and current orientation of the vehicle, a device to determine whether or not the turn signal has been pushed up or down, etc. Although FIG. 2 depicts the set of sensors inside the head unit 14, it is noted that the sensors 32 need not be integral components of the head unit 14. Rather, a vehicle can include any number of sensors in various locations, and the head unit 14 can receive data from these sensors during operation. In operation, the sensors 32 can be used for determining the state of the vehicle 12.

A short-range communication unit 60B allows the head unit 14 to communicate with the portable device 10. The short-range communication unit 60B may support wired or wireless communications, such as USB, Bluetooth, Wi-Fi Direct, etc.

The processor 72 can operate to format messages transmitted between the head unit 14 and the portable device 10, process data from the sensors 32 and the audio input 24, display map images via the display 18, play audio instructions via the audio output, open windows, turn on the air conditioning, determine the likelihood that the head unit 14 can successfully carry out a voice instruction from a user, etc.

The memory 50 can store instructions of an operating system 76, a set of one or more applications 64 and an onboard request handling module 54. The set of applications 64 may include an application for adjusting settings in the vehicle such as opening windows, setting the temperature via the heating and/or air conditioning, turning the engine on and off, adjusting the seats, adjusting the mirrors, etc. The set of applications 64 may also include a music application for turning the radio on and off, tuning to a specific station, identifying the name of the song/band on the radio, scanning through stations, adjusting the volume, turning the compact disk (CD) player on and off, changing the track and/or the CD, etc. Moreover, the set of applications 64 may include a geographic application for displaying map data, providing navigation data, providing traffic data, etc. Further, the head unit 14 may also include applications for instructing the portable device to make a phone call, select a particular song, etc., where the audio in and out can be routed via the microphone 24 and speakers 26 on the head unit 14 from the portable device 10. However, this is not an exclusive list of the applications which may be provided on the head unit 14, and additional or alternative applications may also be included, while some of the applications mentioned above may be omitted.

Additionally, the onboard request handling module 54 may determine the second likelihood that the head unit 14 can successfully carry out a voice instruction, and transmit the second likelihood to the portable device 10 for determining which device will carry out the voice instruction. In an alternative embodiment, the onboard request handling module 54 may determine which device will carry out the voice instruction. The likelihood for the head unit 14 or for the portable device 10 may be a percentage such as 40 percent, may be a probability such as 0.9, may be a category from a set of categories (e.g., "unlikely," "likely," "very likely"), or may be indicated in any other suitable manner.

In any event, the onboard request handling module 54 may receive a voice instruction and transcribe the audio to text using speech recognition techniques. In some embodiments, the onboard request handling module 54 may transmit the audio to a remote server such as a speech recognition server, and may receive corresponding text transcribed by the speech recognition server. The text may then be compared to grammar rules on the head unit 14, or may be transmitted to a natural language processing server, as described in more detail below with reference to FIG. 3, for determining a requested action based on the voice instruction. For example, the head unit 14 may include applications for playing music, opening windows, adjusting temperatures, displaying maps, etc. However, a user may intend to request the same action by using a wide variety of voice instructions. For example, to request navigation directions to the Coliseum in Rome, the user may say, "Take me to the Coliseum," "Where is the Coliseum?" "How do I get to the Coliseum?" "Provide navigation directions to the Coliseum," "Navigate me to the Coliseum," etc.

The head unit may include a set of grammar rules which can receive voice instructions and determine a requested action from each voice instruction. The onboard request handling module 54 can then search the set of applications 64 for an application capable of carrying out the requested action. Moreover, the second likelihood can be determined based on the ability of the identified application to successfully carry out the requested action.

Additionally, the portable device 10 can include a short-range communication unit 60A for communicating with the head unit 14 via a short-range communication link. Similar to the unit 60B, the short-range communication unit 60A can support one or more communication schemes such as USB, Bluetooth, Wi-Fi Direct, etc. The portable device 10 can include audio input and output components such as a microphone 84 and speakers 86. Further, the portable device 10 includes one or more processors or CPUs 88, a GPS module 62, a memory 52, and a cellular communication unit 58 to transmit and receive data via a 3G cellular network, a 4G cellular network, or any other suitable network. The portable device 10 can also include additional sensors (e.g., an accelerometer, a gyrometer) or, conversely, the portable device 10 can rely on sensor data supplied by the head unit 14.

The memory 52 can store, for example, instructions of an operating system 78, a set of applications 66, a search application programming interface (API) 68, and an offboard request handling module 44. The set of applications 66 may include a geographic application including map data as well as navigation data, traffic data, etc. The set of applications 66 may also include a music application for storing and playing downloaded music which may be identified by song or by musician or for streaming music, a weather application for providing weather data, a sports application for providing real-time sports scores, a stocks application for providing real-time stock prices and other stock data, an application for sending text messages, an application for sending emails, a notes application, social media applications for posting to Facebook®, Twitter®, or Instagram®, etc. However, this is not an exclusive list of the applications which may be provided on the portable device 10, and additional or alternative applications may also be included, while some of the applications mentioned above may be omitted.

Additionally, the offboard request handling module 44 may determine the first likelihood that the portable device 10 can successfully carry out a requested action, and may receive the second likelihood from the head unit 14 to determine which device will carry out the requested action. In an alternative embodiment, the offboard request handling module 44 may transmit the first likelihood and the head unit 14 may determine which device will carry out the requested action. In any event, the offboard request handling module 44 may receive a voice instruction and transcribe the audio to text using speech recognition techniques. In some embodiments, the offboard request handling module 54 may transmit the audio to a remote server such as a speech recognition server, and may receive corresponding text transcribed by the speech recognition server. The text may then be compared to grammar rules on the portable device 10, or may be transmitted to a natural language processing server, as described in more detail below with reference to FIG. 3, for determining a requested action based on the voice instruction. The portable device 10 may include a set of grammar rules, similar to the grammar rules as described above, which can receive voice instructions and determine a requested action from each voice instruction. The offboard request handling module 44 can then search the set of applications 66 for an application capable of carrying out the requested action.

In some embodiments, the offboard request handling module 44 may invoke the search API which performs the search for an application capable of carrying out the requested action. In other embodiments, the offboard request handling module 44 may include a list of each application in the set of applications 66 and their respective functionalities. For example, the list may include the weather application and an indication that the application provides weather data. The offboard request handling module 44 may determine the first likelihood based on the ability of the identified application to successfully carry out the requested action based on one or more success factors.

As mentioned above the success factors may include for example, whether the portable device or the head unit can carry out the requested action at all, the quality in which the requested action can be carried out, user preferences based on machine learning, the speed in which the requested action can be carried out, the quality of the network connection for carrying out the requested action, etc. Similar, to the first and second likelihoods, each of the success factors may be represented by a percentage such as 40 percent, may be a probability such as 0.9, may be a category from a set of categories (e.g., "unlikely," "likely," "very likely"), or may be indicated in any other suitable manner.

More specifically, the quality in which the requested action can be carried out may be based on the quality of components within the head unit 14 or the portable device 10. For example, if the requested action is to make a phone call, the microphone and speakers may be more powerful on the head unit 14 than the portable device 10. Therefore, the quality success factor may be higher for the head unit 14 than for the portable device 10. Additionally, the amount of information retrieved in response to the requested action may also be used to determine the quality success factor. For example, if the user requests, "Play Frank Sinatra," and the head unit 14 has access to several Frank Sinatra albums whereas the portable device 10 has access to just one Frank Sinatra album, the quality success factor may be higher for the head unit 14 than the portable device 10.

Moreover, the speed in which the requested action can be carried out may be determined based on the source which is used to carry out the requested action. For example, searching the Internet to find stock quotes may be slower (and sometimes less accurate) than retrieving stock information from an application directed to displaying stock quotes. Furthermore, retrieving data offline may be faster than retrieving data via a communication network. Therefore, when the requested action is to generate a map, the speed success factor may be higher for a portable device 10 which stores offline map data than for a head unit 14 which retrieves map data from a map server.

In some embodiments, the offboard request handling module 44 and/or the onboard request handling module 54 may also include a machine learning unit which may be used in determining the user preferences success factor. For example, if on several previous occasions the user instructed, "Play music," and after follow up questions from the head unit 14 or after receiving additional user-input such as a touch-selection, the user indicates that she intended for the head unit 14 to turn on the radio, the machine learning unit may store an indication that "Play music" corresponds to turning on the radio. As a result, the user preferences success factor may reduce the likelihood that the portable device 10 can successfully respond to "Play music." For example, if initially the offboard request handling module 44 determined that the likelihood the portable device 10 could successfully respond to "Play music" was 0.5, the likelihood may be reduced to 0.3 the next time the user says, "Play Music," based on the user preferences success factor. In this manner, the head unit 14 does not need to ask for additional detail, and the head unit 14 can carry out the request by turning on the radio.

Furthermore, the quality of the network connection at the time of the request may also be a success factor for determining the first and second likelihoods. For example, if the portable device 10 can access requested navigation data via a navigation server but the quality of the network connection is poor, the offboard request handling module 44 may determine that the likelihood the portable device 10 can successfully respond to the requested action is 0.3. On the other hand, if the requested navigation data is stored locally (e.g., in a cache), or the quality of the network connection is good, the offboard request handling module 44 may determine that the likelihood the portable device 10 can successfully respond to the requested action is 0.7.

In some embodiments, in addition to network connectivity, any component which may increase or decrease the ability of the portable device 10 or the head unit 14 to carry out the requested action in an optimal manner may also be a success factor for determining the first and second likelihoods. For example, a portable device 10 which includes speech recognition software for transcribing a requested action to text may have a higher likelihood of successfully responding to the requested action than a head unit 14 which does not include speech recognition software and instead has to transmit audio to a remote server to perform speech recognition, assuming the portable device 10 and the head unit 14 have the same likelihoods with respect to the other success factors. In another example, if the user requests "Play Beethoven," and the portable device 10 or the head unit 14 timeout when communicating with a remote speech recognition server or natural language processing server for transcribing and interpreting the voice instruction, respectively, the portable device 10 or the head unit 14 may return a likelihood of 0, even if the portable device 10 or the head unit 14 have access to songs by Beethoven.

Each of the success factors may be aggregated and/or combined in any suitable manner to determine the likelihood that the portable device 10 or the head unit 14 can successfully carry out the requested action. For example, the success factors may be added together, multiplied together, weighted, scaled, or otherwise mathematically combined as desired to reflect an overall likelihood. The success factors are merely example or possible success factors which may be used to determine the first and second likelihoods. Additional or alternative success factors may also be used to determine the first and second likelihoods, and/or in some embodiments, one or more of the success factors may be omitted.

The software components 44, 66, 68, and 78 can include compiled instructions and/or instructions in any suitable programming language interpretable at runtime. In any case, the software components 44, 66, 68 and 78 execute on the one or more processors 88. The search API 68 generally can be provided in different versions for different respective operating systems. For example, the maker of the portable device 10 can provide a Software Development Kit (SDK) including the search API 68 for the Android™ platform, another SDK for the iOS™ platform, etc.

In an exemplary scenario, John Doe is driving a vehicle which has a smart phone attached to the head unit. John presses the voice activation button 22 and says, "Put on Ode to Joy." Both the portable device 10 and the head unit 14 may receive this voice instruction and using grammar rules, both devices may determine the requested action is to play the song "Ode to Joy" by Beethoven. After the portable device 10 and the head unit 14 search their respective applications, the portable device 10 may determine the first likelihood is a probability of 0.9 based on the success factors, because the portable device 10 includes a music application which stores a downloaded copy of the requested song title. On the other hand, the head unit 14 may identify a music application in the head unit 14 which may search a CD player, a radio application, etc., for instances of the requested song title. As a result, the head unit 14 may determine based on the success factors that the second likelihood is a probability of 0.1. Therefore, the portable device 10 may carry out the requested action by invoking the music application on the portable device 10 and causing the music application to play "Ode to Joy."

Figure 3:
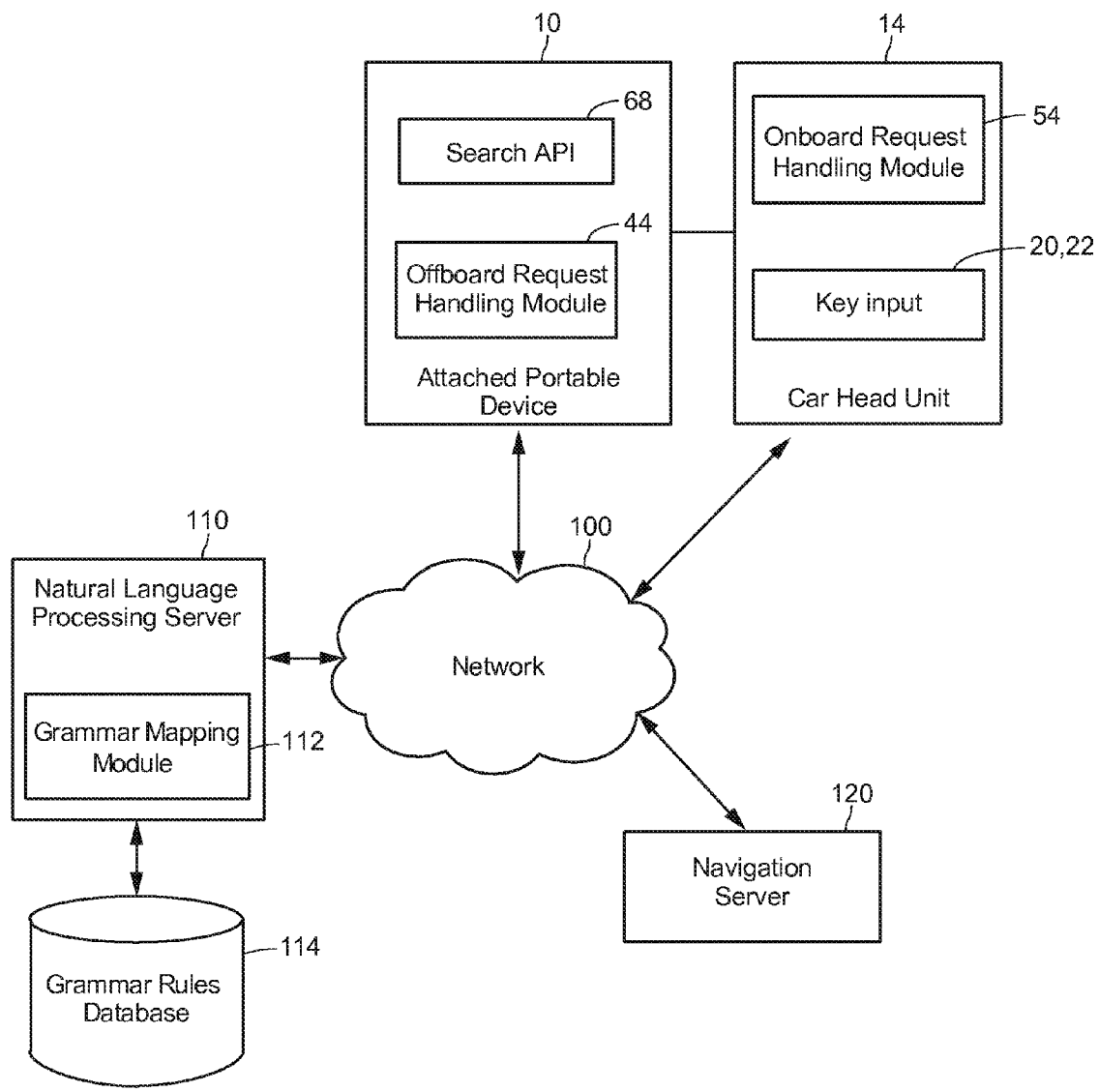
FIG. 3 is a block diagram of an example communication system in which the portable device, and the head unit of FIG. 1 can operate.

FIG. 3 illustrates an example communication system in which the portable device 10 and the head unit 14 can operate to carry out the voice instruction. For ease of illustration, the portable device 10, and the head unit 14 are illustrated in a FIG. 3 in a simplified manner without some of the components as illustrated in FIG. 2 and/or discussed elsewhere in this disclosure.

The portable device 10, and the head unit 14 have access to a wide area communication network 100 such as the Internet via a long-range wireless communication link (e.g., a cellular link). In the example configuration of FIG. 3, the portable device 10, and the head unit 14 communicate with a navigation server 120 that provides navigation data and map data, and a natural language processing server 110 that converts voice instructions to requested actions in which the devices can respond. In some embodiments, the portable device 10 and the head unit 14 can communicate with multiple natural language processing servers. For example, the portable device 10 may communicate with a first natural language processing server which converts voice instructions to requested actions for applications in the portable device 10. The head unit 14 may communicate with a second natural language processing server which converts voice instructions to requested actions for application in the head unit 14.

More generally, the portable device 10 and the head unit 14 can communicate with any number of suitable servers. For example, in another embodiment, the navigation server 120 provides directions and other navigation data while a separate map server provides map data (e.g., in a vector graphics format), a traffic data server provides traffic updates along the route, a weather data server provides weather data and/or alerts, a speech recognition server, etc.

The natural language processing server 110 may receive text transcribed from voice instructions from the head unit 14 or the portable device 10. A grammar mapping module 112 within the natural language processing server 110 may then compare the received text corresponding to the voice instructions to grammar rules in a grammar rules database 114. For example, based on the grammar rules, the grammar mapping module 112 may determine for the instruction, "What is the weather in San Francisco?" that the requested command is to provide weather data, and the location is San Francisco.

Moreover, the grammar mapping module 112 may make inferences based on context. For example, the instruction does not specify whether the weather data should be current weather data, a monthly forecast, the weather from 1952, etc. However, the grammar mapping module 112 may infer that the instruction is for current weather data, for example, based on machine learning. Therefore, the natural language processing server 110 may transmit, "Find current weather for San Francisco, Calif." as the requested action.

In some embodiments, the grammar mapping module 112 may find synonyms or nicknames for words or phrases in the instruction to determine the requested action. Moreover, the grammar rules database 112 may include a list of entity categories such as cities, popular bands, sports team names, etc. When the voice instruction includes "San Francisco," the grammar mapping module 112 may match "San Francisco" with an entity in the cities category and determine the instruction includes a location. Moreover, if the voice instruction is, "Chicago Bears schedule," the grammar mapping module 112 may match with an entity in the sports team names category, and determine the requested action is related to sports. After the natural language processing server 110 determines the requested action, the grammar mapping module 112 may transmit the requested action to the device from which the voice instruction was received (e.g., the portable device 10 or the head unit 14).

Figure 4A:
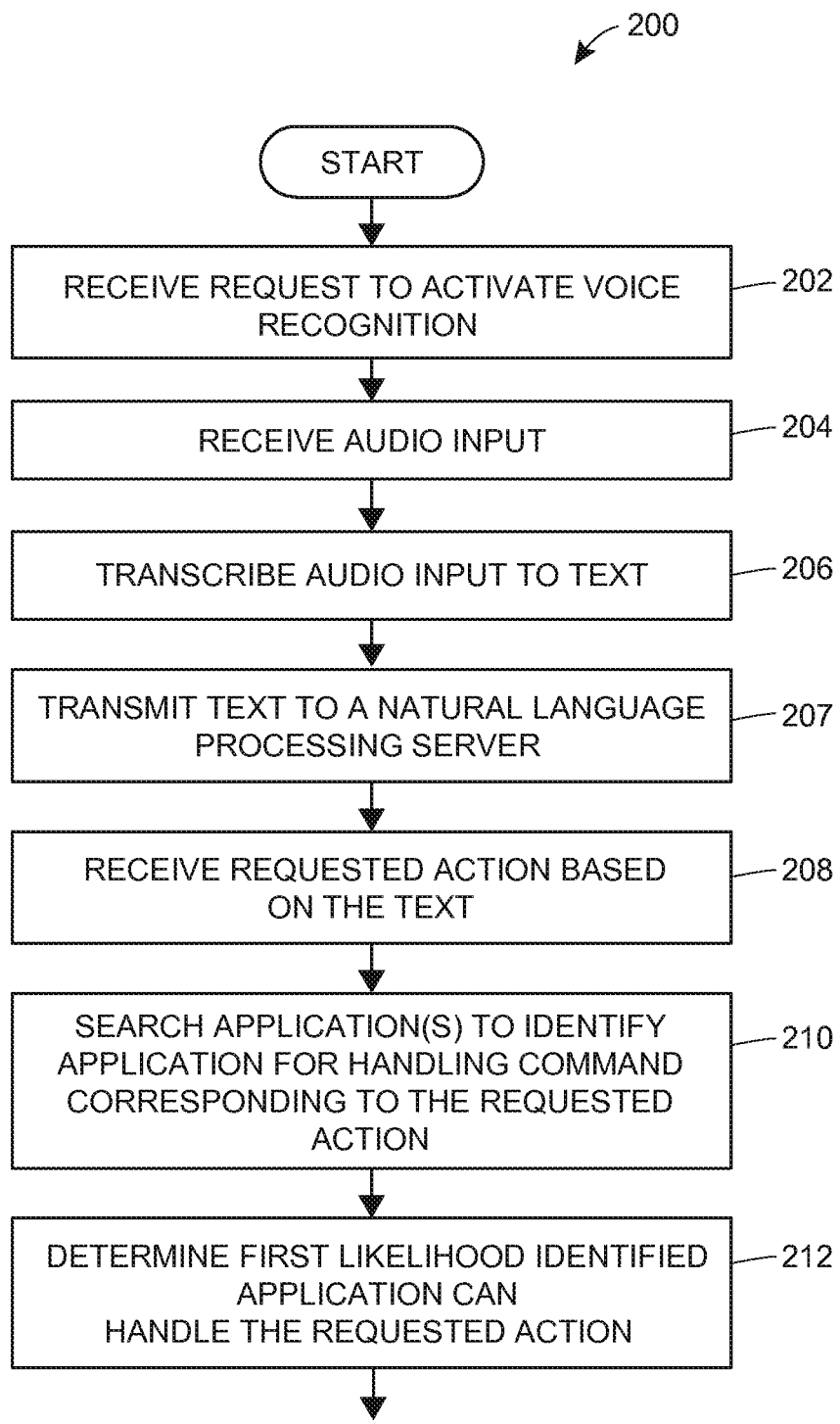
FIG. 4A is a flow diagram of an example method for carrying out a voice instruction, which can be implemented in the portable device or the head unit.

Now referring to FIG. 4A, an example method 200 for carrying out a voice instruction by the offboard request handling module 44 (or another suitable system) is shown. The method can be implemented in a set of instructions stored on a computer-readable memory and executable on one or more processors of the portable device 10, for example. While the example method 200 is described for the portable device 10 in FIG. 4A, a similar method may simultaneously be performed by the onboard request handling module 54 of the head unit 14.

At block 202, the offboard request handling module 44 receives a request to activate voice recognition. For example, the user may select the voice activation button 22 on the vehicle 12 which may request the head unit 14 to activate voice recognition. As a result, the head unit 14 may detect whether the head unit 14 is communicatively connected to any external computing devices. When the head unit 14 detects the portable device 10, the head unit may transmit over the short-range communication link 16 of FIG. 1, a request for the portable device 10 to activate voice recognition, which may be received by the offboard request handling module 44. The user may then input a voice instruction to the portable device 10 via the microphone 84 (block 204). At the same time the head unit 14 may also receive the voice instruction via the microphone 24. In some embodiments the voice instruction may be received at the head unit 14, and the head unit may transmit the voice instruction to the portable device via the short-range communication link 16.

As a result, the offboard request handling module 44 may transcribe the voice instruction to text (block 206) and transmit the text to a natural language processing server (block 207). The head unit 14 may also transcribe the voice instruction to text, and may transmit the text to a same or different natural language processing server, or may perform the natural language processing on the head unit 14 to determine a requested action from the text. In any event, the offboard request handling module 44 may receive an indication of a requested action based on the text (block 208). For example, the voice instruction may be "Take me to the Big Apple," and as a result, the offboard request handling module 44 may receive an indication of the requested action "Provide navigation directions from current location to New York City, N.Y."

The offboard request handling module 44 may then search the set of applications 66 in the portable device 10 to identify an application capable of carrying out the requested action (block 210). More specifically, the offboard request handling module 44 may search for an application which can provide navigation directions. In some embodiments, the offboard request handling module 44 may invoke a search API 68 which may perform the search.

When the offboard request handling module 44 finds the desired application such as a geographic application on the portable device 10, the offboard request handling module 44 may determine the first likelihood based on the ability of the geographic application to provide navigation directions from the user's current location to New York City (block 212). For example, while the geographic application may be capable of providing navigation directions, the display screen on the portable device 10 may be smaller than the display screen on the head unit 14 which may be reflected in the quality success factor, and the portable device 10 may have a poor connection with a communication network reducing the speed success factor for retrieving the navigation directions. Therefore, based on these and/or other success factors, the likelihood that the application can successfully provide navigation directions from the determined current location to New York City may be 70 percent.

Figure 4B:
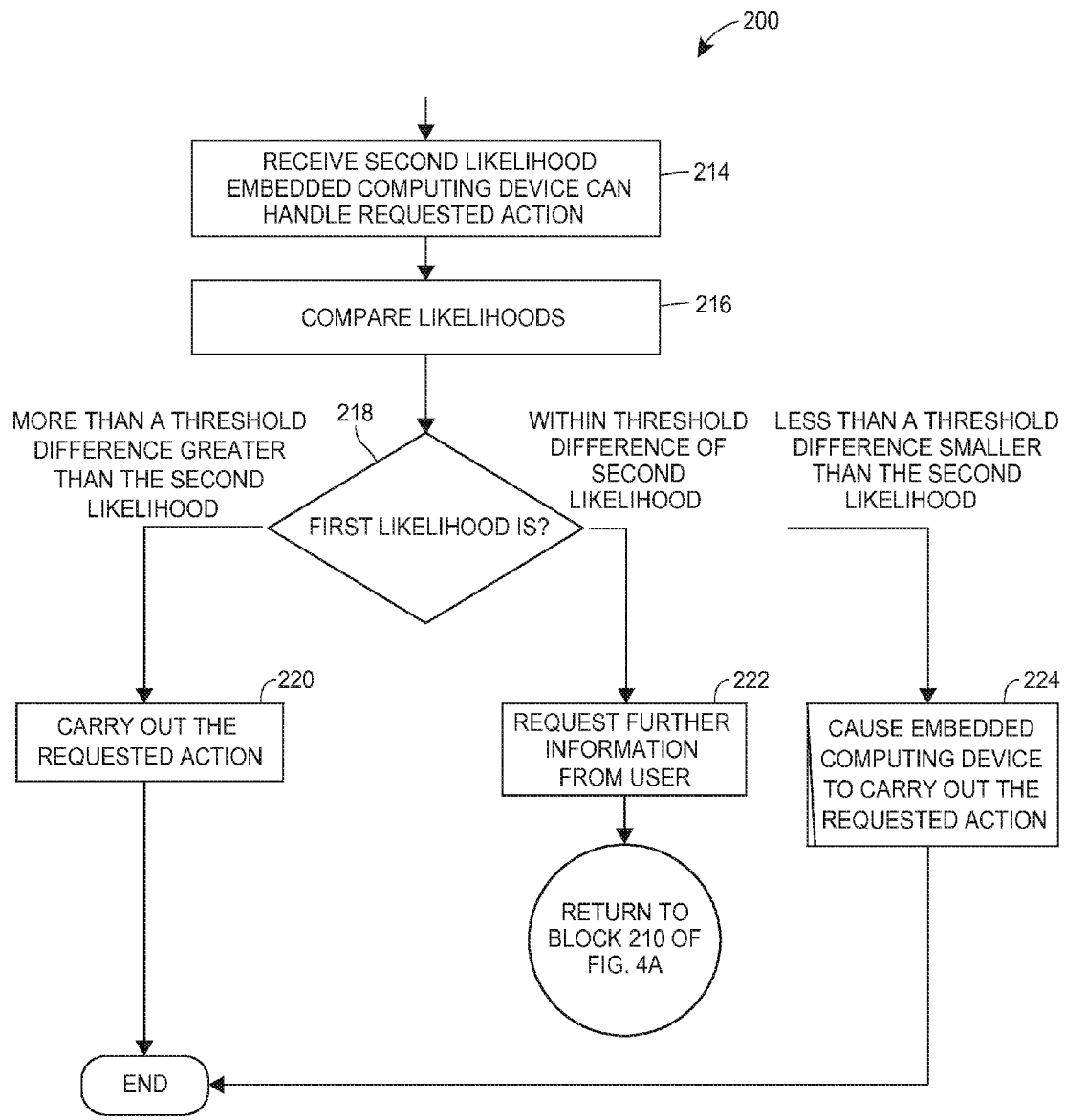
FIG. 4B is a continuation of the flow diagram of FIG. 4A of the example method for carrying out a voice instruction, which can be implemented in the portable device or the head unit.

Turning now to FIG. 4B, while the offboard request handling module 44 determines a first likelihood, the onboard request handling module 44 may determine a second likelihood in a similar manner as the method steps 208-212 of FIG. 4A. The offboard request handling module 44 may then receive the second likelihood (block 214) over the short-range communication link 16, and may determine whether the head unit 14 or the portable device 10 should carry out the requested action based on the first and second likelihoods. For example, offboard requesting module 44 may compare the first likelihood to the second likelihood (block 216) and determine the difference between the first likelihood and the second likelihood.

The difference may then be compared to a fixed threshold amount, for example, 10 percent, and if the first likelihood is greater than the second likelihood by more than 10 percent, the portable device 10 may carry out the requested action (block 220). On the other hand, if the second likelihood is greater than the first likelihood by more than 10 percent, the offboard computing device 44 may transmit an instruction for the head unit to carry out the requested action, via the short-range communication link 16 (block 224). Further, if the first likelihood and the second likelihood are within 10 percent of each other (e.g., the first likelihood is 45 percent and the second likelihood is 55 percent or vice versa), the offboard computing device 44 may cause additional information to be requested (block 222).

For example, if the instruction is "Play music," the portable device 10 and the head unit 14 may determine that the first and second likelihoods are the same based on the success factors. As a result, the portable device 10 may ask the user and/or cause head unit 14 to ask the user, "On which device?" or "Which song?" Then the portable device 10 may receive the response from the user and repeat the method from block 204. In this manner, a new first likelihood and a new second likelihood may be determined based on the audio input and the additional audio input. The new first and second likelihoods may be determined such that one or both of the likelihoods change from the previous first likelihood and/or the previous second likelihood. Moreover, in some scenarios, the new first likelihood and the new second may no longer be within the fixed threshold amount of each other.

In some embodiments, the portable device 10 may store the resulting requested action in the machine learning unit so that the additional information does not need to be requested if the user instructs "Play Music" in the future. For example, when the user instructs, "Play Music", the user preferences success factor for the portable device 10 may reduce the first likelihood, while the user preferences success factor for the head unit 14 may increase the second likelihood.

Moreover, in some embodiments, the head unit 14 and the portable device 10 may both carry out portions of the requested action. For example, when the user requests a digital map for navigation directions, the portable device 10 may generate the navigation directions and transmit the generated navigation directions to the head unit 14 for the head unit 14 to display on the bigger screen.

Figure 4C:
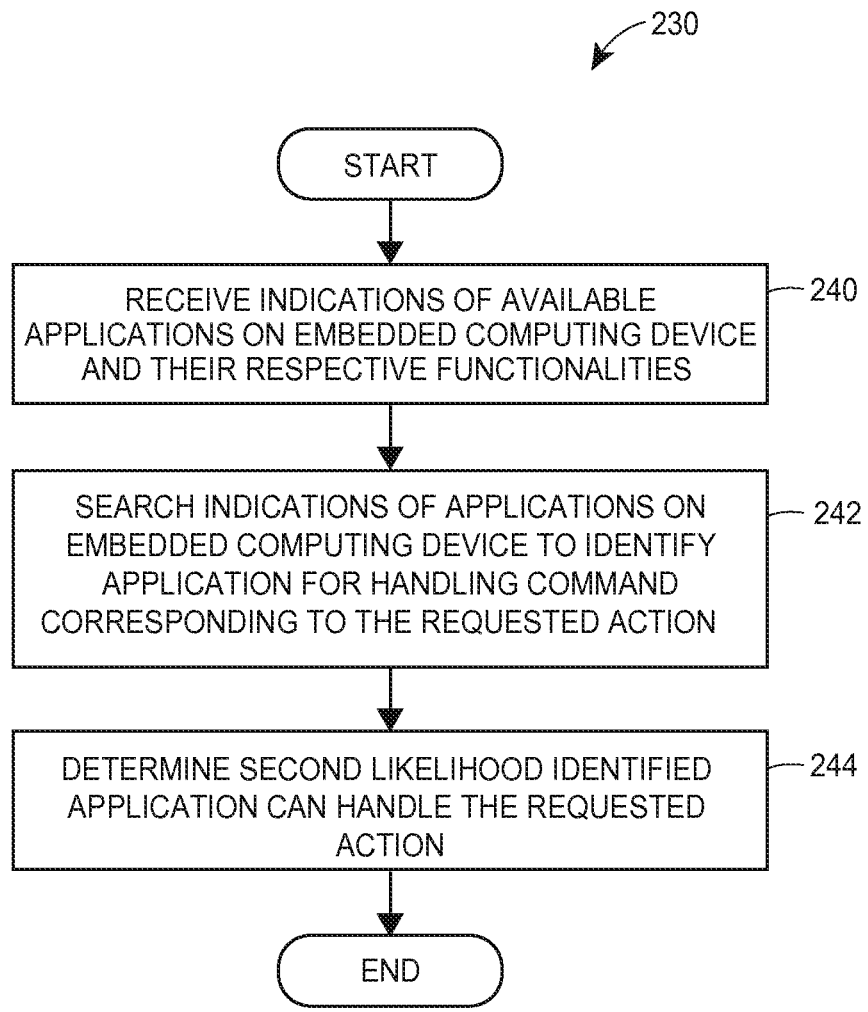
FIG. 4C is a flow diagram of an alternative implementation to block 214 of the method of FIG. 4B, which can be implemented in the portable device.

In some embodiments, the portable device 10 may determine both the first likelihood and the second likelihood. In such an embodiment, the head unit 14 may merely request that the portable device 10 activates voice recognition and respond to the request if the portable device 10 causes the head unit 14 to carry out the requested action. Otherwise, the portable device 10 may perform the steps for responding to a voice instruction. FIG. 4C illustrates an example method 230 which is an alternative to the method step 214 of FIG. 4B. The method can be implemented in a set of instructions stored on a computer-readable memory and executable on one or more processors of the portable device 10, for example.

At block 240, the offboard request handling module 44 may receive indications of available applications 64 on the head unit 14 and their respective functionalities. For example, the offboard request handling module 44 may receive an indication of a temperature control application for setting the temperature in the vehicle, an indication of a geographic application for displaying mapping and navigation data, an indication of a window control application for opening and closing windows, etc.

The offboard request handling module 44 may then search the indications of available applications 64 on the head unit 68 to identify an application capable of carrying out the requested action (block 242). For example, the offboard request handling module 44 may search for an application which can "Provide navigation directions from current location to New York City, N.Y."

When the offboard request handling module 44 finds the desired application such as a geographic application from the head unit 14, the offboard request handling module 44 may determine the second likelihood based on the ability of the geographic application to provide navigation directions from the user's current location to New York City using one or more success factors (block 244). For example, the offboard request handling module 44 may receive information corresponding to the functionality of the geographic application, data stored in the geographic application, etc., to determine that while the geographic application may be capable of providing map data and navigation directions, the user preference is to generate navigation directions on the portable device 10, and the quality of the navigation directions is low on the head unit 14. Therefore, the likelihood that the geographic application on the head unit 14 can successfully provide navigation directions from the user's current location to New York City may be 60 percent.

Figure 5:
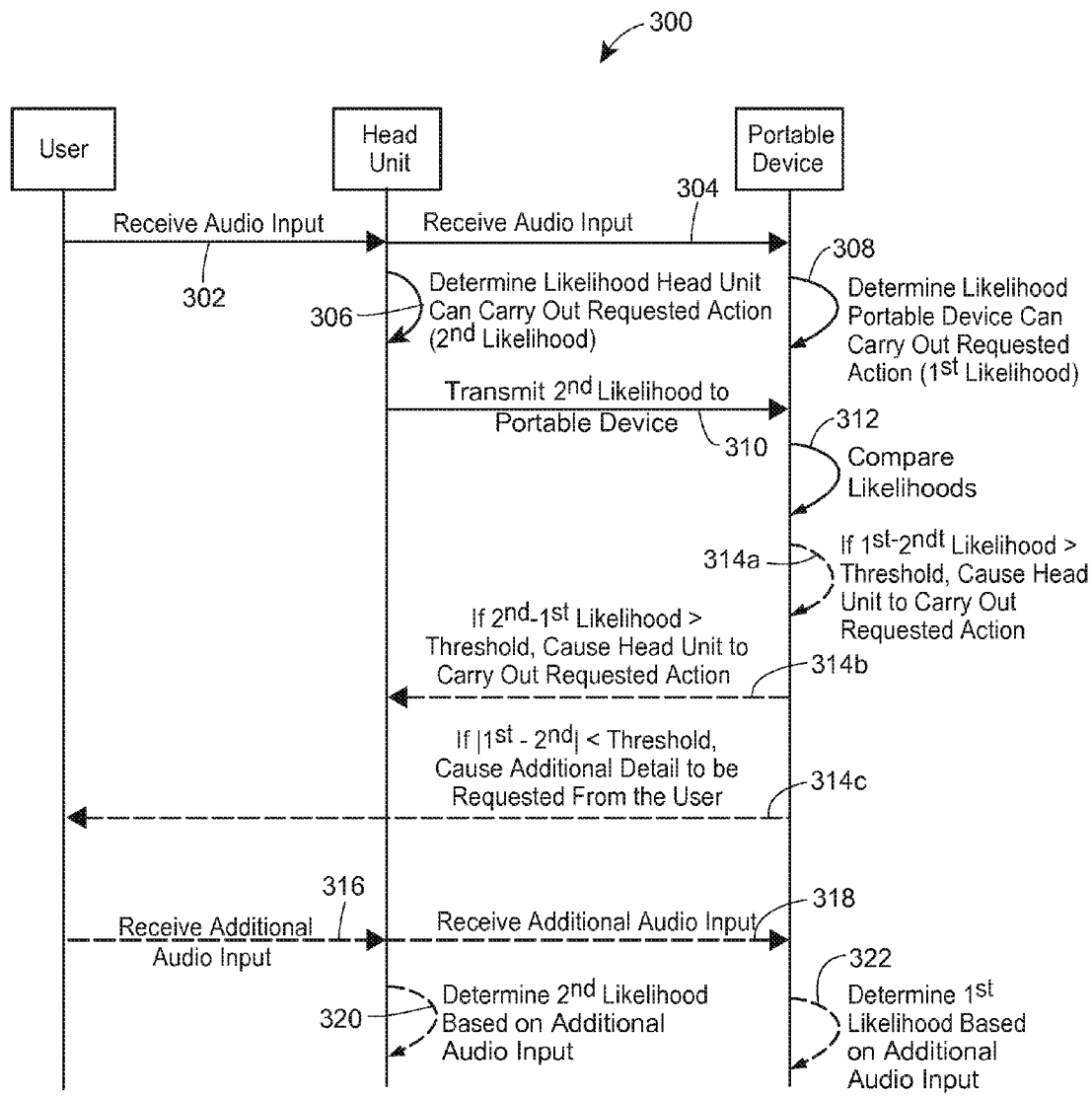
FIG. 5 is a message diagram of an example interaction between the user, the portable device, and the head unit in accordance with the presently described embodiments.

FIG. 5 illustrates an exemplary interaction 300 between the user, the head unit 14 and the portable device 10 when the user provides a voice instruction. Both the head unit 14 (step 302) and the portable device 10 (step 304) receive audio input from the user in a similar manner as described above. For example, the user may input a voice instruction to the portable device 10 via the microphone 84 of FIG. 1, and at the same time the head unit 14 may also receive the voice instruction via the microphone 24. In other embodiments, the head unit 14 may receive the voice instruction and transmit the voice instruction to the portable device 10 via the short-range communication link 16.

The head unit 14 may then determine a second likelihood corresponding to the likelihood that the head unit 14 can successfully carry out a requested action from the voice instruction, while the portable device 10 determines a first likelihood, similarly corresponding to the likelihood that the portable device 10 can successfully carry out the requested action from the voice instruction. To determine the first and second likelihoods, the portable device 10 and the head unit 14, respectively, may transcribe the voice instruction to text (or communicate with the same or different speech recognition servers to receive a text version of the voice instruction) and transmit the text to the same or different natural language processing servers to determine a requested action from the text. The portable device 10 and the head unit 14 may search applications on the respective devices to each identify an application capable of carrying out the requested action. Then the portable device 10 and the head unit 14 may determine the first likelihood and the second likelihood respectively, based on one or several success factors.

The head unit 14 may then transmit the second likelihood to the portable device 10 (step 310), and the portable device 10 may determine whether the head unit 14 or the portable device 10 should carry out the requested action, for example, by comparing the first likelihood with the second likelihood (step 312). In some embodiments, the head unit 14 may compare the first and second likelihoods. In any event, based on the comparison there may be several results as denoted in dashed lines by 314a, 314b, and 314c. While FIG. 5 illustrates three outcomes as a result of the comparison, the comparison is not limited to three outcomes. Instead, there may be two outcomes, four outcomes, ten outcomes, fifty outcomes or any suitable number of outcomes as a result of the comparison.

In any event, if the first likelihood is greater than the second likelihood by more than a fixed threshold amount (e.g., 10 percent), then the portable device 10 may carry out the requested action from the voice instruction. For example, the portable device 10 may play a particular song, generate navigation directions from an origin (e.g., the user's current location) to a destination, provide current weather data, etc.

If the second likelihood is greater than the first likelihood by more than the fixed threshold amount, then the portable device 10 may cause the head unit 14 to carry out the requested action from the voice instruction. For example, the head unit 14 may open the windows, adjust the seat, set the temperature in the vehicle, display navigation directions from an origin (e.g., the user's current location) to a destination, etc.

On the other hand, if the first and second likelihoods are within the fixed threshold amount of each other (e.g., first likelihood-second likelihood<fixed threshold amount, and second likelihood-first likelihood<fixed threshold amount, as denoted by the absolute value symbol (||) in FIG. 5), then the portable device 10 may cause additional detail to be requested from the user. For example, the portable device 10 may request additional detail from the user, or the portable device 10 may cause the head unit 14 to request additional detail from the user. The request may be, "Which device would you like to play music on?" "Where do you want to go?" "Did you mean the Arizona Cardinals or the St. Louis Cardinals?" etc.

In response to the request for additional detail, both the head unit 14 and the portable device 10 may receive additional audio input from the user (steps 316 and 318), and the head unit 14 and the portable device 10 may determine a second likelihood (step 320) and a first likelihood (step 322), respectively, based on the audio input and the additional audio input. The portable device 10 may then compare the first and second likelihoods and repeat this process until the first and second likelihoods differ by more than the fixed threshold amount.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 200, and 230 may include one or more function blocks, modules, individual functions or routines in the form of tangible computer-executable instructions that are stored in a non-transitory computer-readable storage medium and executed using a processor of a computing device (e.g., a server, a personal computer, a smart phone, a vehicle head unit, a tablet computer, a head mounted display, a smart watch, a mobile computing device, or other personal computing device, as described herein). The methods 200, and 230 may be included as part of any backend server (e.g., a natural language processing server, a navigation server or any other type of server computing device, as described herein), portable device modules, or vehicle head unit modules of the example environment, for example, or as part of a module that is external to such an environment. Though the figures may be described with reference to the other figures for ease of explanation, the methods 200, and 230 can be utilized with other objects and user interfaces. Furthermore, although the explanation above describes steps of the methods 200, and 230 being performed by specific devices (such as a portable device 10, a natural language processing server 110, and a vehicle head unit 14), this is done for illustration purposes only. The blocks of the methods 200, and 230 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for responding to a voice instruction by onboard and/or offboard devices within a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A portable device comprising:
    a communication interface to communicate with a computing device embedded within a vehicle via a short-range communication link;
    one or more processors coupled to the communication interface; and
    a non-transitory computer-readable memory coupled to the one or more processors and storing thereon instructions that, when executed by the one or more processors, cause the portable device to:
        receive audio input in response to receiving, via the short-range communication link, a request to activate voice recognition from the embedded computing device,
        activate voice recognition on the portable device,
        perform the voice recognition on the received audio input to determine a requested action based on the received audio input,
        determine a first likelihood that the portable device can carry out the requested action,
        receive, via the short-range communication link, a second likelihood from the embedded computing device that the embedded computing device can carry out the requested action,
        determine, based on the first likelihood and the second likelihood, whether the embedded computing device or the portable device should carry out the requested action, and
        cause one of the embedded computing device or the portable device to carry out the requested action in accordance with the determination based on the first likelihood and the second likelihood.

2. The portable device of claim 1, wherein to determine whether the embedded computing device or the portable device should carry out the requested action, the instructions cause the portable device to determine whether the first likelihood differs from the second likelihood by more than a fixed threshold amount.

3. The portable device of claim 2, wherein to determine whether the embedded computing device or the portable device should carry out the requested action, the instructions further cause the portable device to:
    in response to determining that the first likelihood does not differ from the second likelihood by more than a fixed threshold amount, request additional audio input,
    receive the additional audio input, and
    determine the first likelihood and the second likelihood based on the audio input and the additional audio input.

4. The portable device of claim 1, wherein to determine the first likelihood, the instructions cause the portable device to search one or more applications on the portable device to identify an application capable of carrying out the requested action.

5. The portable device of claim 1, wherein the instructions cause the portable device to receive the audio input from the embedded computing device, via the communication interface.

6. The portable device of claim 1, wherein the communication interface is a first communication interface, the portable device further comprising:
    a second communication interface to communicate with a network server via a long-range communication link;
    wherein the instructions further cause the portable device to:
        transmit the received audio input to the network server via the second communication interface, and
        receive an indication of the requested action via the second communication interface.

7. The portable device of claim 1, wherein the requested action includes a request for a playback of at least one of: (i) a particular song, (ii) audio transmitted by a particular radio station, (iii) music by a particular musician, or (iv) audio from a particular device installed in the vehicle, and wherein the instructions further cause the portable device to:
    identify a first application capable of audio playback on the portable device,
    identify a second application capable of audio playback on the embedded computing device, and
    determine the first likelihood and the second likelihood based on abilities of the first application and the second application, respectively, to provide the requested playback.

8. A portable device comprising:
    a communication interface to communicate with a computing device embedded within a vehicle via a short-range communication link;
    one or more processors coupled to the communication interface; and
    a non-transitory computer-readable memory coupled to the one or more processors and storing thereon instructions that, when executed by the one or more processors, cause the portable device to:
        receive audio input while the embedded computing device receives the same audio input in response to receiving a request to activate voice recognition from the embedded computing device, before determining whether the portable device or the embedded computing device will carry out a requested action based on the received audio input,
        activate voice recognition on the portable device,
        perform the voice recognition on the received audio input to determine the requested action based on the received audio input,
        determine a first likelihood that the portable device can carry out the requested action,
        receive, from the embedded computing device, a second likelihood that the embedded computing device can carry out the requested action,
        determine, based on the first likelihood and the second likelihood, whether the embedded computing device or the portable device should carry out the requested action, and
        cause one of the embedded computing device or the portable device to carry out the requested action in accordance with the determination based on the first likelihood and the second likelihood.

9. The portable device of claim 8, wherein to determine whether the embedded computing device or the portable device should carry out the requested action, the instructions cause the portable device to determine whether the first likelihood differs from the second likelihood by more than a fixed threshold amount.

10. The portable device of claim 9, wherein to determine whether the embedded computing device or the portable device should carry out the requested action, the instructions further cause the portable device to:
in response to determining that the first likelihood does not differ from the second likelihood by more than a fixed threshold amount, request additional audio input, receive the additional audio input, and
determine the first likelihood based on the audio input and the additional audio input.

11. The portable device of claim 8, wherein to determine the first likelihood, the instructions further cause the portable device to search one or more applications on the portable device to identify an application capable of carrying out the requested action.

12. The portable device of claim 8, wherein the instructions cause the portable device to receive the audio input from the embedded computing device, via the communication interface.

13. The portable device of claim 8, wherein the communication interface is a first communication interface, the portable device further comprising:
a second communication interface to communicate with a network server via a long-range communication link;
wherein the instructions further cause the portable device to:
transmit the received audio input to the network server via the second communication interface, and
receive an indication of the requested action via the second communication interface.

14. The portable device of claim 8, wherein the requested action corresponds to a request for navigation directions from an origin to a destination, and wherein the instructions further cause the portable device to:
identify an application capable of providing navigation directions on the portable device; and
determine the first likelihood based on an ability of the first application to provide the requested navigation directions from the origin to the destination.

15. A method for determining a device for responding to a voice instruction, the method comprising:
receiving, at one or more processors in a portable device, audio input, while a computing device embedded within a vehicle receives the same audio input and in response to receiving a request to activate voice recognition from the embedded computing device, before determining whether the portable device or the embedded computing device will carry out a requested action based on the received audio input;
activating, by the one or more processors, voice recognition on the portable device,
performing, by the one or more processors, the voice recognition on the received audio input to determine the requested action based on the received audio input;
determining, by the one or more processors, a first likelihood that the portable device can carry out the requested action;
receiving, at the one or more processors and from the embedded computing device, a second likelihood that the embedded computing device can carry out the requested action,
determining, by the one or more processors and based on the first likelihood and the second likelihood, whether the embedded computing device or the portable device should carry out the requested action; and
causing, by the one or more processors, one of the embedded computing device or the portable device to carry out the requested action in accordance with the determination based on the first likelihood and the second likelihood.

16. The method of claim 15, wherein determining whether the embedded computing device or the portable device should carry out the requested action comprises determining, by the one or more processors, whether the first likelihood differs from the second likelihood by more than a fixed threshold amount.

17. The method of claim 16, wherein determining whether the embedded computing device or the portable device should carry out the requested action further comprises:
in response to determining that the first likelihood does not differ from the second likelihood by more than a fixed threshold amount, requesting, by the one or more processors, additional audio input;
receiving, at the one or more processors, the additional audio input; and
determining, by the one or more processors, the first likelihood based on the audio input and the additional audio input.

18. The method of claim 15, wherein determining the first likelihood comprises searching, by the one or more processors, one or more applications on the portable device to identify an application capable of carrying out the requested action.

19. The method of claim 15, wherein the requested action includes a request for a playback of at least one of: (i) a particular song, (ii) audio transmitted by a particular radio station, (iii) music by a particular musician, or (iv) audio from a particular device installed in the vehicle, further comprising:
identifying, by the one or more processors, an application capable of audio playback on the portable device; and
determining, by the one or more processors, the first likelihood based on an ability of the application to provide the requested playback.

* * * * *